United States Patent [19]
Gaydos

[11] Patent Number: 5,595,017
[45] Date of Patent: Jan. 21, 1997

[54] FISHLINE SINKER

[76] Inventor: Andrew Gaydos, 193 Upper Heckman Rd., North Versailles, Pa. 15137

[21] Appl. No.: 447,262

[22] Filed: May 22, 1995

[51] Int. Cl.$^6$ .................................................. A01K 95/00
[52] U.S. Cl. .................................................. 43/44.88
[58] Field of Search .................. 43/44.95, 44.87, 43/44.88, 44.92, 43.12, 44.91, 44.93

[56] References Cited

U.S. PATENT DOCUMENTS

| | | | |
|---|---|---|---|
| 631,197 | 8/1899 | Bourke | 43/44.95 |
| 1,943,192 | 1/1934 | Semar | 43/44.88 |
| 2,111,958 | 3/1938 | Bardon | 43/44.88 |
| 2,135,847 | 11/1938 | Rosenquist | 43/44.88 |
| 2,183,818 | 12/1939 | Minser | 43/44.88 |
| 2,217,972 | 10/1940 | Smith | 43/44.88 |
| 2,257,415 | 9/1941 | Gerdin | 43/44.88 |
| 2,399,298 | 4/1946 | Sevegny | 43/44.88 |
| 2,425,069 | 8/1947 | Metzler | 43/44.88 |
| 2,470,995 | 5/1949 | Lesser | 43/44.92 |
| 2,957,267 | 10/1960 | Dempsey | 43/44.88 |
| 3,714,731 | 2/1973 | Benson | 43/44.88 |
| 3,750,324 | 8/1973 | Verheij | 43/44.88 |
| 4,856,224 | 8/1989 | Fincher | 43/44.95 |

*Primary Examiner*—Kurt Rowan
*Attorney, Agent, or Firm*—H. Keith Hauger, Esq.

[57] ABSTRACT

A deep troller weight apparatus for connecting a fishline to a weight body. This invention consists of a locking device located within the weight body for engaging or disengaging a fishline after the deep troller weight apparatus has been submerged into a body of water. By exerting a moderate force on the fishline, the weight body glides by gravitational force along the fishline towards the hook and lure for reeling in the catch. A spiral shaped guide holds the fishline at a fixed position about the deep troller weight body and prevents the locking device from releasing the fishline under relatively small forces.

5 Claims, 3 Drawing Sheets

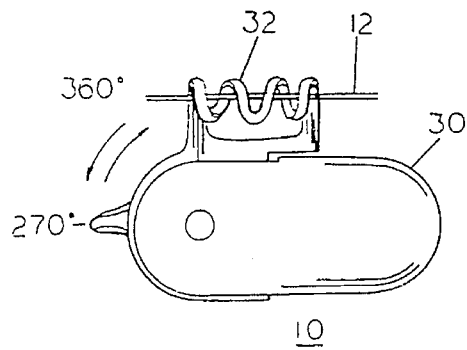
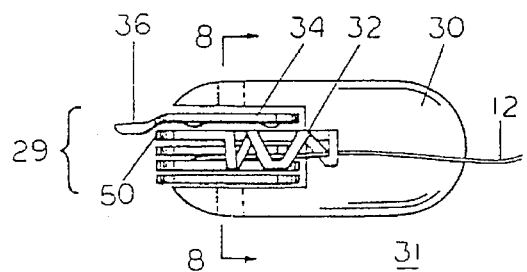
FIGURE 2  FIGURE 3
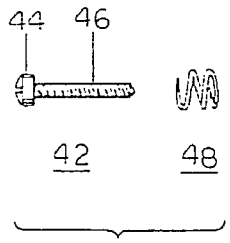
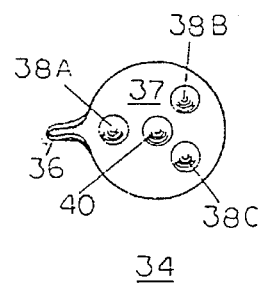
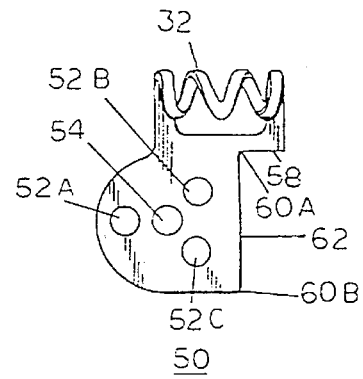
FIGURE 4  FIGURE 5  FIGURE 6
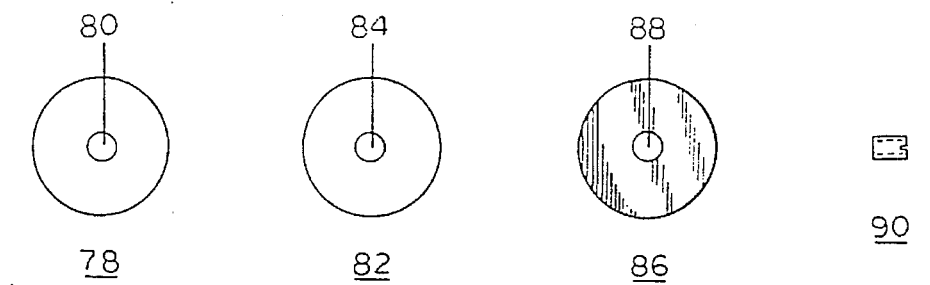
FIGURE 7

FISHLINE SINKER

BACKGROUND OF THE INVENTION

1. Field of the Invention

This invention relates generally to a fishline sinker for attachment to a fishline having a locking and releasing means enabling a fisherman to lock or release a fishline by a moderate force exerted by a fishing rod.

2. Description of the Prior Art

Fishing is not only a commercial venture, but a sport enjoyed by persons of all ages around the world. Those who enjoy the recreational sport of fishing forever search to improve their skills through perfection of the various equipment essentially transforming what has been known as the art of fishing into the science of fishing.

Gerdin U.S. Pat. No. 2,257,415 entitled "Fishline Sinker" is a typical fishline sinker using a helical spring to hold a fishline. A second fishline sinker is seen in Croce U.S. Pat. No. 3,786,595 showing a lever mechanism for engaging or disengaging a fishline. The invention presented in this application enables a fishline to be secured or released with relative ease making the sport of fishing more enjoyable and the commercial venture of fishing more profitable.

SUMMARY OF THE INVENTION

It is, therefore, an object of the present invention to provide a fishline sinker that is simply constructed and cost efficient to produce.

It is the further object of this present invention to provide a fishline sinker that does not exert excessive force on a fishline causing distortion thereto.

It is the further object of the present invention to provide a fishline sinker that does not cause the fishline to fail after a relatively short period of use.

It is the further object of the present invention to provide a fishline sinker wherein a fishline may be easily placed or removed.

It is the further object of the present invention to provide a fishline sinker that will not be easily lost from the fishline in the process of exerting a moderate force thereon for purposes of trolling to a depth in a body of water at which a fish may be lured.

It is the further object of the present invention to provide a fishline sinker which may be quickly and easily interchanged from a fishline.

More specifically, the present invention is a deep troller weight apparatus for receiving a fishline comprising a deep troller weight body for attachment to said fishline; a fishline locking means housed within said weight body allowing said fishline to be engaged to said deep troller weight body at a fixed point prior to lowering said deep troller weight apparatus with a hook and lure at an end of said fishline into a body of water wherein said locking means acts in a second capacity to release said deep troller weight apparatus from said locking means of said fishline when activated by a moderate pull on said fishline, freeing said deep troller weight apparatus to glide by gravitational forces along said fishline to a lower level on said fishline where said hook and lure are located; a fishline guiding means for holding said fishline at a fixed position about said deep troller weight body and preventing said locking means from releasing said fishline under relatively small forces exerted on said fishline.

These objects, as well as other objects and advantages of the present invention will become apparent from the following description, in reference to the illustrations appended hereto.

BRIEF DESCRIPTION OF THE DRAWINGS

For a better understanding of the invention, reference may be had to the accompanying drawings in which:

FIG. 2 is a plan view of a deep troller weight apparatus;

FIG. 3 is a top elevational view of a deep troller weight apparatus;

FIG. 4 is an exploded elevational view of a threaded shaft and spring;

FIG. 5 shows a view of a first pressure disk with a lever;

FIG. 6 illustrates a static pressure disk integral with a line trolley;

FIG. 7 is an exploded elevation view showing various pressure disks including a third and fourth pressure disk along with a miscellaneous washer being a fifth pressure disk and a cylindrical sleeve nut;

DESCRIPTION OF PREFERRED EMBODIMENTS

Figure 1:
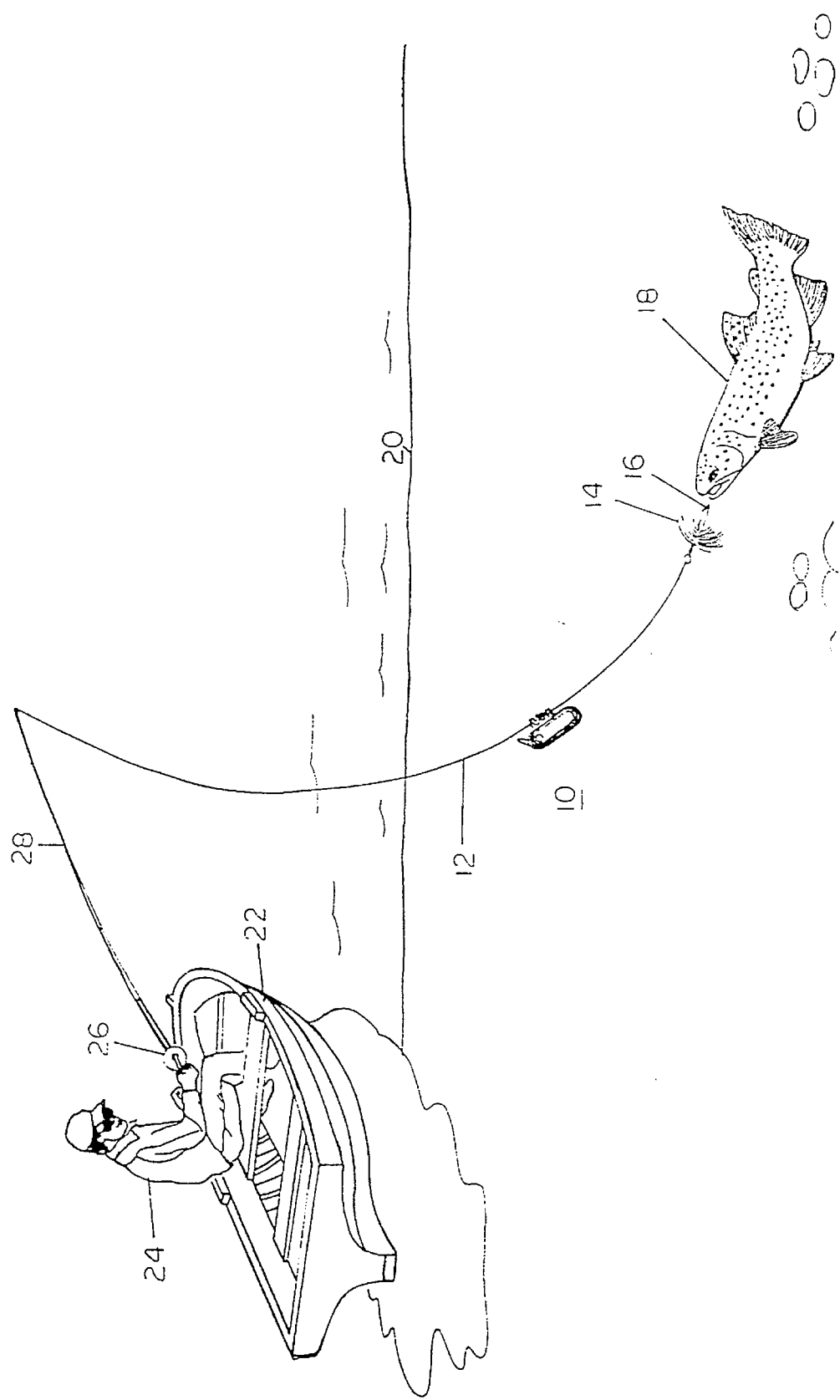
FIG. 1 is a fragmentary side elevational view depicting a deep troller weight apparatus (also referred to as a fishline sinker) attached to a fishline in connection with a lure and hook with reference to a water line and a fisherman in a boat at or about said water line.
Figure 9:
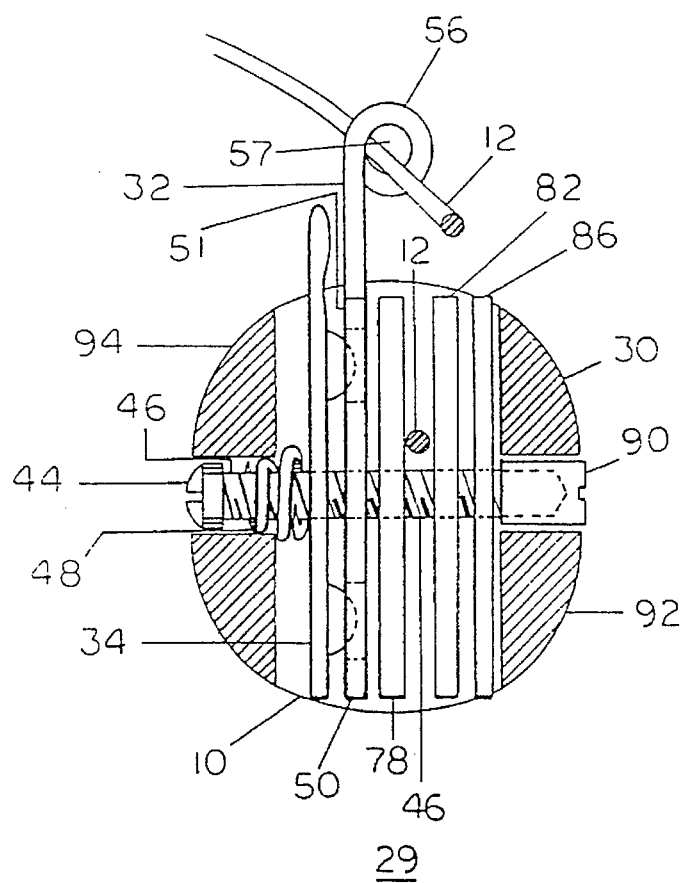
FIG. 9 is a sectional view broken on line 8—8 of FIG. 3 showing a locking means in detail.

Referring to the drawings, FIG. 1 represents a fragmentary side elevational view of a deep troller weight apparatus 10. The deep troller weight apparatus 10 fastens to a fishline 12 at a distance from a lure 14 and hook 16 all being submerged below a water line 20. A fisherman 24 in a boat 22 makes use of a reel 26 and rod 28 to troll the deep troller weight apparatus 10 and lure 14 in an effort to catch a fish 18. The deep troller weight apparatus 10 is engaged to the fishline 12 by a locking means 29 encased in a deep troller weight body 30 as shown in FIGS. 3 and 9. The deep troller weight apparatus 10 may be disengaged from the fishline 12 by fisherman 24 exerting a moderate jerking force transmitted from rod 28 to line 12 after fish 18 has been hooked to hook 16. This allows deep troller weight apparatus 10 to slide freely along fishline 12 as fisherman 24 reels in fish 18.

Figure 8:
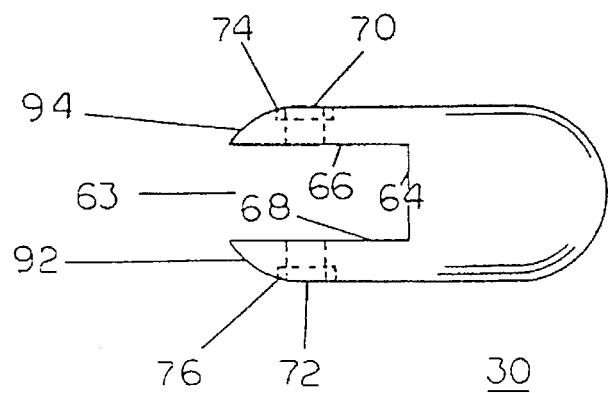
FIG. 8 is a top elevational view of a deep troller weight body without the locking and guiding means.

Deep troller weight body 30 may be constructed in a variety of geometric shapes and is shown in FIGS. 2, 3 and 8 as an elliptical shape laterally and in FIG. 10 as a circular shape at cross section 8—8. The locking means 29 is located within slot 63 and along a threaded shaft 46 which is supported by right slot pedestal 92 and left slot pedestal 94 which form slot 63. The locking means 29 consist of a plurality of pressure disks located within a slot 63 of said deep troller weight body 30. The pressure disks consist of a first pressure disk 34 having a lever means 36 to rotate this first pressure disk 34 to either engage or disengage a detent means 37 consisting of raised detents 38A, 38B and 38C spaced equally and concentrically on first pressure disk 34. A rightward static pressure disk 50 is designed with opposite concentric and equally spaced openings 52A, 52B and 52C to coordinate with opposing raised detents 38A, 38B and 38C such that when pressure is exerted against first pressure disk 34 by moving lever means 36 clockwise from the 270 degree position to the 360 degree position helical compression spring 48 exerts lateral force across threaded shaft 46 on third pressure disk 78 rightward of the static pressure disk 50 where fishline 12 is located between the third pressure disk 78 and a fourth pressure disk 82. When lever means 36 is at the 360 degree position raised detents 38A, 38B and 38C are in contact with a rightward surface of static pressure disk 50 causing the pressure to be exerted on fishline 12 located between third pressure disk 78 and fourth pressure disk 82. When lever means 36 is in the 270 degree position as is shown in FIG. 9, raised detents 38A, 38B and 38C enter into spaced openings 52A, 52B and 52C, respectively, to relieve pressure on fishline 12 allowing fishline 12 to be disengaged from lock means 29. The third pressure disk 78 and fourth pressure disk 82 are preferably constructed of synthetic rubber of which neoprine is a preferred embodiment. A fifth pressure disk 86 is located rightward of the fourth pressure disk 82 to ensure tightness of the locking means 29. Cylindrical sleeve nut 90 threads to threaded shaft 46 having head cap 44 which may be turned clockwise or counterclockwise to either tighten or loosen the pressure on helical compression spring 48 and to further secure locking means 29 as a unit. First pressure disk 34, static pressure disk 50, third pressure disk 78, fourth pressure disk 82 and fifth pressure disk 86 have first pressure disk bore 40, static pressure disk bore 54, third pressure disk bore 80, fourth pressure disk bore 84 and fifth pressure disk bore 88, respectively, for receiving threaded shaft 46.

Line trolley guiding means 32 holds fishline 12 at a fixed position about deep troller weight apparatus 10 to prevent locking means 29 from releasing fishline 12 when a relatively small force is exerted on fishline 12 when fisherman 24 is trolling and lever means 36 is at the 360 degree position. Line trolley guiding means 32 consists of a spiral ring structure 56 which encompasses fishline 12 through an eye 57 of spiral ring structure 56. Spiral ring structure 56 is an integral part of static pressure disk 50 alleviating additional manufacturing processes to incorporate spiral ring structure 56 as an integral part of deep troller weight body 30. Line trolley arm 58 acts to hold spiral ring structure 56 at a fixed distance above an upper surface 31 of deep troller weight body 30. Spiral ring structure 56 will not rotate and does remain static because static pressure disk 50 is cut at chordal flat sector 62 creating point 60A and point 60B. Chordal flat sector 62 is constructed such as to contact inside weight body rear surface 64, being adjacent to inside weight body left surface 66 and inside weight body right surface 68 which form slot 63. Chordal flat sector 62 contacts and remains parallel to inside weight body rear surface 64 preventing rotation of static pressure disk 50 and preventing locking means 29 from releasing fishline 12 under relatively small forces.

Threaded shaft 46 is supported by right slot pedestal 92 and left slot pedestal 94 of deep troller weight body 30. Right slot pedestal 92 is constructed with right shaft bore 70 centrally concentric to right slot pedestal 92 and likewise left slot pedestal 94 is constructed with left shaft bore 72 centrally concentric to left slot pedestal 94 to allow rotation of threaded shaft 46. Left counter sink 74 is located in left slot pedestal 94 concentric to left shaft bore 72. Likewise, right counter sink is located in right slot pedestal 92 concentric to right shaft bore 70. Left counter sink 74 and right counter sink 76 prevent head cap 44 and cylindrical sleeve nut 90 from protruding from deep troller weight body 30 providing deep troller weight body 30 with a clean aerodynamic design.

In accordance with the provisions of the Patent Statutes, we have explained the principle and operation of our invention and have illustrated and described what we consider to represent the best embodiment thereof.

I claim:

1. A deep troller weight apparatus for receiving a fishline comprising:

a deep troller weight body for attachment to said fishline;

a fishline locking means housed within said weight body allowing said fishline to be engaged to said deep troller weight body at a fixed point prior to lowering said deep troller weight apparatus with a hook and lure at an end of said fishline into a body of water wherein said locking means acts in a second capacity to release said deep troller weight apparatus from said locking means of said fishline when activated by a moderate pull on said fishline freeing said deep troller weight apparatus to glide by gravitational forces along said fishline to a lower level on said fishline where said hook and lure are located, wherein said locking means consists of a plurality of pressure disks housed in a cavity of said deep troller weight body and affixed about a shaft, a spring means located about said shaft which functions to create a lateral pressure on said plurality of pressure disks, wherein said fishline is secured between two of said pressure disks being two opposing disks until said fishline is released from said two opposing pressure disks when said locking means is activated by said moderate pull on said fishline;

a fishline guiding means for holding said fishline at a fixed position about said deep troller weight body and preventing said locking means from releasing said fishline under relatively small forces exerted on said fishline.

2. A deep troller weight apparatus according to claim 1, wherein said plurality of pressure disks consists of a first pressure disk having a lever means which functions to rotate said first pressure disk for engagement or disengagement through a detent means with or from a rightward static pressure disk, wherein said two opposing pressure disks consist of a third pressure disk rightward of said static pressure disk for holding said fishline between said third pressure disk and a fourth pressure disk rightward of and opposing said third pressure disk, a fifth pressure disk rightward of said fourth pressure disk which functions to ensure tightness of said locking means, said spring means located leftward of said plurality of pressure disks creating said lateral pressure on said plurality of pressure disks.

3. A deep troller weight apparatus according to claim 1, wherein said fishline guiding means consists of a spiral ring structure encompassing said fishline, said spiral ring structure being statically positioned above an upper surface of said weight body, said spiral ring structure being integral to said static pressure disk, said static pressure disk having a chordal flat sector at and parallel to a weight body rear cavity surface, being a first surface inside said cavity, said chordal flat sector being in contact with said weight body rear surface to prevent rotational motion of said static pressure disk and to prevent said locking means from releasing said fishline under relatively small forces.

4. A deep troller weight apparatus for receiving a fishline comprising:

a deep troller weight body for attachment to said fishline;

a fishline locking means housed within a cavity of said weight body consisting of a shaft secured between opposing pedestals and having a plurality of pressure disks located about said shaft consisting of a first pressure disk having a lever means to rotate said first pressure disk to engage or disengage said first pressure disk through a detent means to or from a rightward static pressure disk, a third pressure disk rightward of said static pressure disk for gripping said fishline in cooperation with a fourth pressure disk rightward of and opposing said third pressure disk, a fifth pressure disk rightward of said fourth pressure disk to ensure tightness of said locking means, a spring means located leftward of said plurality of pressure disk creating lateral pressure along said shaft and causing said fishline to lock between said third pressure disk and said fourth pressure disk:

a fishline guiding means consisting of a spiral ring structure encompassing in an eye of said spiral ring structure said fishline, said spiral ring located above an upper surface of said weight body, said spiral ring structure being integral to said static pressure disk, said static pressure disk having a chordal flat sector for contact with a weight body rear slot surface to prevent rotational motion of said static pressure disk and prevent said locking means from releasing said fishline under relatively small forces.

5. A deep troller weight apparatus according to claim 4, wherein said detent means consists of a plurality of raised detents spaced equally and concentrically on a rightward surface of said first pressure disk for engagement or disengagement to or from a plurality of opposite concentric and equally spaced openings located on said static pressure disk, said engagement or disengagement being accomplished by moving said lever means clockwise or counterclockwise to engage or disengage said plurality of detents to or from said plurality of openings, wherein said spring means creates said lateral pressure along said shaft when said plurality of detents are disengaged from said plurality of openings, wherein said fishline may be released from said third pressure disk and said fourth pressure disk when said plurality of detents are engaged into said plurality of openings.

\* \* \* \* \*